Figure 1:
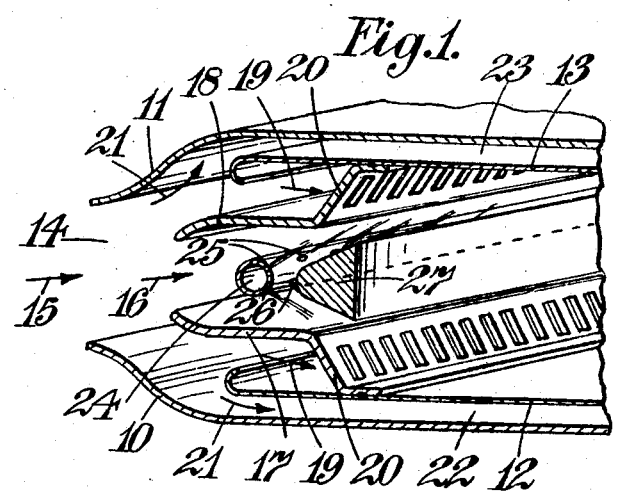

Jan. 12, 1960

F. M. JOHNSON ET AL 2,920,449

FUEL INJECTION MEANS FOR FEEDING FUEL TO AN ANNULAR
COMBUSTION CHAMBER OF A GAS TURBINE ENGINE
WITH MEANS FOR DIVIDING THE AIR FLOW

Filed July 11, 1955

3 Sheets-Sheet 1

United States Patent Office 2,920,449
Patented Jan. 12, 1960

2,920,449

FUEL INJECTION MEANS FOR FEEDING FUEL TO AN ANNULAR COMBUSTION CHAMBER OF A GAS TURBINE ENGINE WITH MEANS FOR DIVIDING THE AIR FLOW

Francis Murray Johnson, London, and Denis Richard Carlisle, Risley, England, assignors to Rolls-Royce Limited, Derby, England, a British company Application July 11, 1955, Serial No. 521,306

Claims priority, application Great Britain July 20, 1954

14 Claims. (Cl. 60—39.74)

This invention relates to combustion equipment for gas-turbine engines and is particularly concerned with combustion equipment of the type comprising essentially coaxial inner and outer air casing walls and, within the annular space between the air casing walls, an annular flame tube having inner and outer walls which are coaxial with the air casing walls. Combustion equipment of this type is hereinafter referred to as "annular combustion equipment."

The present invention has for an object to provide in annular combustion equipment improved fuel injection means whereby the combustion is effected in a desirable manner.

According to the present invention annular combustion equipment comprises a fuel injection assembly which is mounted at the inlet end of the combustion space between the flame tube walls and which assembly comprises a passage extending through the assembly to permit part of the combustion air entering the combustion space from the air casing to flow without substantial deviation in the passage, means in the passage to divide the air passing through the passage into inner and outer annular air streams, and fuel supply means arranged to introduce fuel into said inner and outer air streams whereby air flowing through the passage assists in the atomization of the fuel to produce inner and outer substantially continuous annular sheet sprays of atomized fuel within the annular flame tube. Preferably the fuel supply means are adapted so that both the inner and outer annular sheet sprays are of conical form, the outer spray being outwardly divergent in the direction of flow, and the inner spray being inwardly convergent in the direction of flow.

The means dividing the flow of air through the passage may comprise a ring mounted adjacent the outlet of the passage and having an end portion of divergent axial cross-section. Preferably the divergence of the ring is chosen to produce an acceleration of the airflow through the passage.

According to one arrangement of the invention the fuel supply means are accommodated within the annular passage and comprise circumferentially-spaced orifice means arranged together to direct annular sprays of fuel within the parts of the passage which carry the inner and outer air streams.

According to another arrangement, the fuel supply means are arranged to produce on at least two surfaces of the fuel injection assembly layers of fuel in contact with the air flowing through the passage, said surfaces having spill lips at their downstream extremities whereby the airflow through the passage assists in the atomization of fuel flowing over the lips to produce inner and outer substantially continuous annular sheet sprays of atomized fuel within the annular flame tube.

The fuel supply means may in these arrangements comprise a manifold pipe within the annular passage up-stream of the air flow dividing means having drilled orifices through which the fuel emerges in the downstream direction, the flow from some orifices having a radially outward component and the flow from other orifices having a radially inward component. Thus fuel may be directed into the passage parts for inner and outer air streams to mix with the air flowing therein or onto the surfaces having the spill lips. In another arrangement, the fuel supply means comprise a plurality of circumferentially-spaced nozzle elements each having slots communicating with a central supply bore or supply bores, some of said slots being directed in the downstream sense and radially outwards and others being directed in the downstream sense and radially inwards.

According to a further feature of the invention, the fuel injection assembly may also comprise second or pilot fuel supply means for initiating, or maintaining the combustion of fuel leaving the passage parts and entering the combustion space or both. Such pilot fuel supply means may be mounted on the means dividing the passage to be located between the inner and outer substantially continuous annular sheet sprays. When the fuel supply means directs fuel onto surfaces having spill lips as above set forth, the second fuel supply means may be arranged to introduce fuel into said passage in such a manner that under at least low airflow conditions the fuel is introduced directly into the flame tube without contact with said spill lips.

Figure 2:
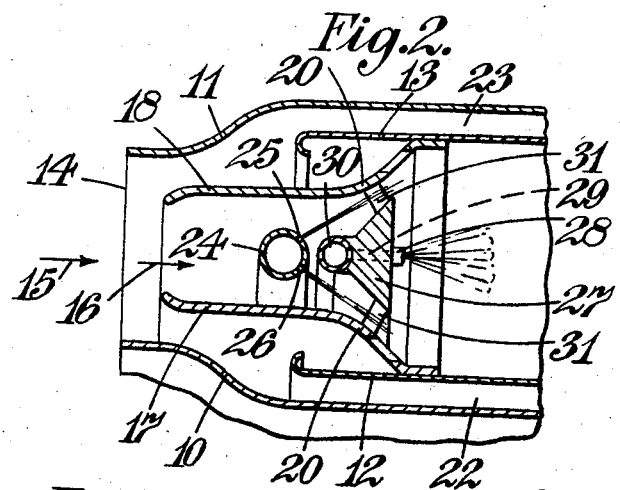
Figure 3:
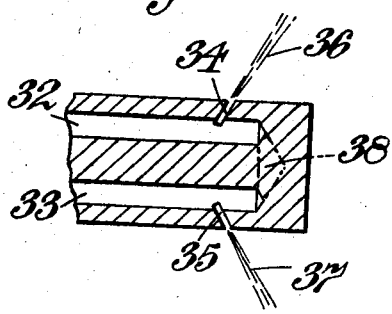
Figure 3A:
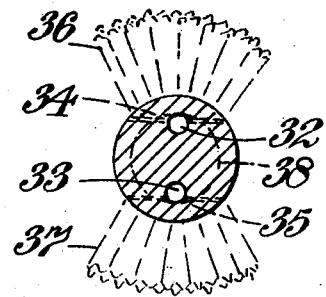
Figure 4:
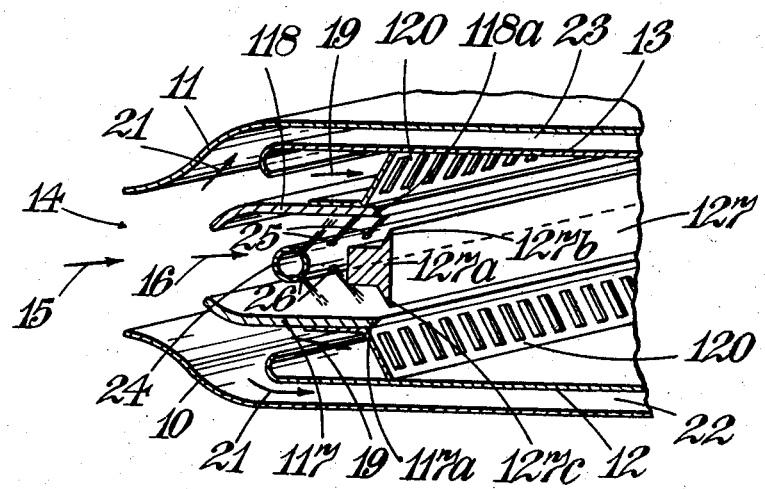
Figure 5:
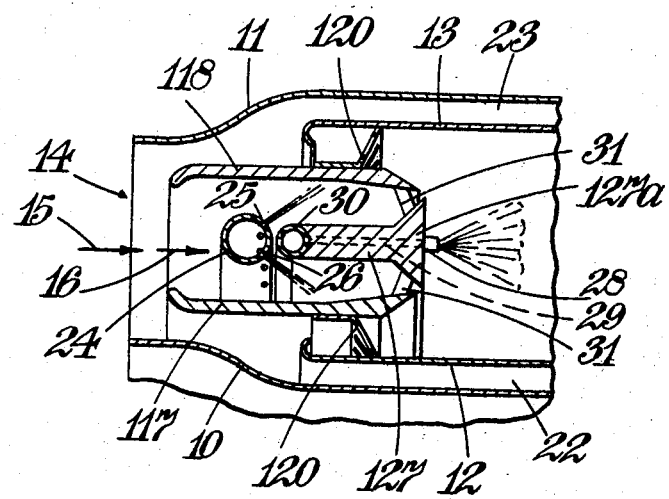
Figure 6:
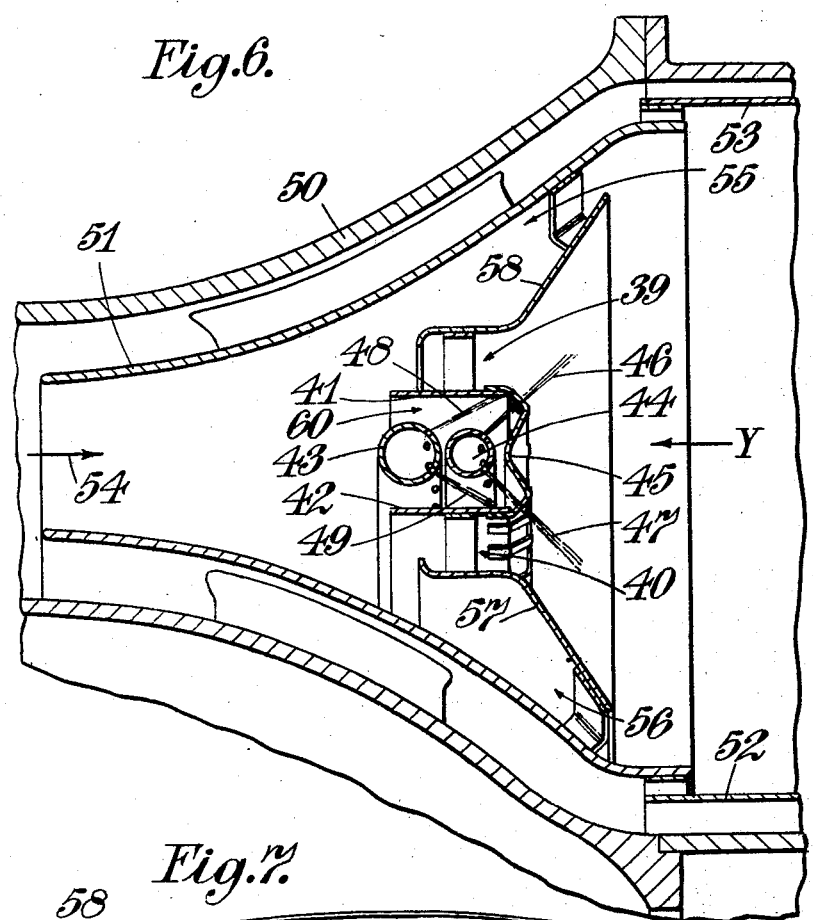
Figure 7:
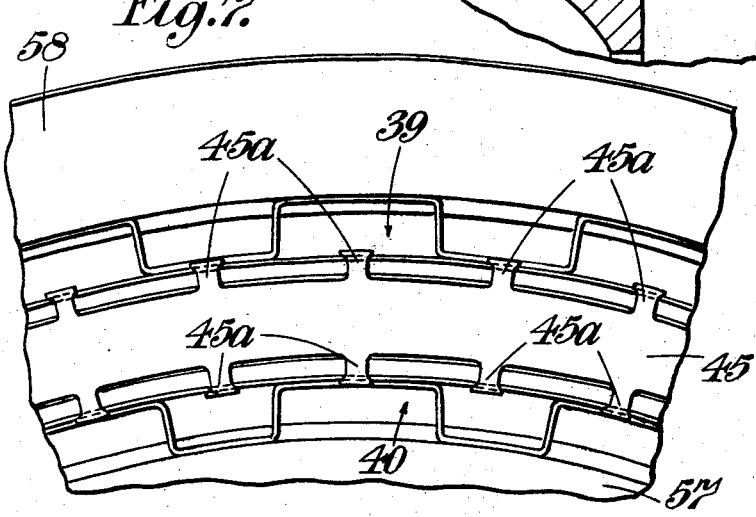

Preferred embodiments of the present invention are illustrated in the accompanying diagrammatic drawings in which:

Figure 1 is a schematic cross-sectional view through the inlet end of annular combustion equipment, Figure 2 is a modification of the arrangement of Figure 1 showing pilot fuel supply means, Figures 3 and 3a show modified forms of fuel injector devices, Figure 4 is a view corresponding to Figure 1 showing another construction of annular combustion equipment, Figure 5 is a modified form of the construction of Figure 4, Figure 6 shows in axial section yet another construction of annular combustion equipment, and Figure 7 is a view in the direction of arrow Y on Figure 6.

In all figures of the drawings like references are used to indicate like parts.

Referring to Figure 1, the combustion equipment comprises inner and outer annular air casing walls 10 and 11, which in the engine assembly are coaxial with the axis of the compressor and turbine rotor system. The air casing walls thus define an annular air space within which are accommodated inner and outer flame tube walls 12 and 13, between which is formed an annular combustion space. Compressed air is delivered by the compressor system of the engine to the annular combustion equipment thus constituted through the annular entry at 14 as indicated by arrows 15. As indicated by arrow 16, part of this air enters the passage formed between inner and outer annular walls 17 and 18 forming part of a fuel injection assembly. A second part of this air flows as indicated by arrows 19 through the perforated support strips 20 which as illustrated are formed integrally with the annular walls 17 and 18 and support the latter from the flame tube walls 12 and 13. The strips 20 are curved to provide an outlet flare from the passage between walls 17 and 18.

As indicated by arrows 21, a third part of the air flowing into the combustion chamber passes into the annular spaces 22 and 23 afforded between the air casing wall 10 and flame tube wall 12, and between the air casing wall 11 and the flame tube wall 13 respectively. This air normally enters the combustion space within the flame tube to mix with the combustion products towards the downstream end of the flame tube.

It will be noted that air which enters the combustion space through the passage defined between the walls 17 and 18, does so without substantial deviation in its general direction of flow in the passage, and in certain preferred embodiments according to the invention the quantity of air passing into the passage may be of the order of 5% of the total mass flow entering the combustion chamber.

The fuel injection assembly also comprises a fuel manifold pipe 24 disposed in the annular passage between the walls 17, 18, which pipe 24 has two sets of circumferentially-spaced drilled orifices; one set of these orifices indicated at 25 sprays fuel towards the combustion space with a radially outward component, and the other set indicated at 26 sprays fuel towards the combustion space with a radially inward component. The fuel sprays on leaving the orifices 25 and 26 spread out fanwise in the downstream direction towards the combustion space.

Means are provided adjacent the outlet end of the annular passage between the walls 17, 18 to divide the air flowing through the passage into inner and outer annular streams and to deflect the outer stream outwardly and the inner stream inwardly; in the form illustrated in Figure 1, the means comprises a ring 27 of divergent axial cross-section. Thus one of the air streams leaving the passage assists the atomization of fuel delivered through orifices 25 and the other of the air streams assists the atomization of fuel delivered through orifices 26. In this manner inner and outer substantially continuous annular sheet sprays of atomized fuel are produced within the flame tube.

The arrangement shown in Figure 2 is similar to that of Figure 1. In this arrangement, however, the ring 27 supports a number of circumferentially-spaced pilot fuel injection nozzles 28 fed with fuel through passages 29 from a pilot fuel manifold 30 mounted on the ring 28 at its apex, that is, at the upstream side thereof. Thus the pilot fuel injection means is located between the sprays from the main fuel orifices 25, 26. The pilot nozzles 28 may be used under low speed running conditions of the engine, or for the purpose of initiating combustion of the main fuel sprays from the orifices 25, 26, or both for low speed running or for main fuel spray ignition purposes.

In Figures 3 and 3a, modified forms of fuel injector are shown. The full lines in Figures 3 and 3a show a fuel nozzle having separate supply ducts 32 and 33 to orifices 34 and 35 which are formed by "saw-cut" slots penetrating the ducts 32 and 33. Fuel emerges from the orifices in the form of fan-like sheet sprays indicated at 36 and 37. In the alternative arrangement shown by dotted lines in Figures 3 and 3a single bore 38 is formed in the injector body and the saw-cuts 34 and 35 are made into this bore. The fuel injector devices as illustrated in Figures 3 and 3a may be supported in circumferentially spaced relation on a fuel manifold such as 24 in Figures 1 and 2 to provide sheet-like sprays of fuel in the divided airflow passage.

Referring now to Figure 4, the combustion equipment shown is of the annular type and similar in many respects to that shown in Figure 1. However, in this construction the passage indicated by arrow 16 is afforded between coaxial inner and outer annular wall members 117 and 118 of the fuel injector assembly, which are made separate from perforated support strips 120 and are secured to them as by welding. It will be noted that in this construction also air flows through the passage 16 without substantial deviation in its general direction of flow, and in certain preferred embodiments the quantity of air passing into the passage may be of the order of 5% of the total mass flow entering the combustion equipment.

The downstream ends 117a and 118a of the annular wall members 117 and 118 of the fuel injector assembly are formed as sharp edges and thus provide spill lips over which fuel sprayed on to the inner surfaces of the wall members 117 and 118 flows on entering the combustion space.

The manifold pipe 24 is so positioned within the annular passage 16 that fuel from the orifices 25 is sprayed with a radially outward component on to the wall member 118, and that fuel from the other set of orifices 26 is sprayed with a radially inward component on to the wall of the inner wall member 117. The fuel sprays leaving the orifices 25 and 26 impinge on the surfaces of the wall members 118 and 117 and spread out fanwise in flowing in the downstream direction towards the spill lips. The angle of spread is such that on reaching the spill lip the layer of fuel is substantially circumferentially continuous.

The fuel injector assembly is also provided adjacent the outlet end of the annular passage 16 with means to divide the air passing through the passage into inner and outer air streams and to deflect the outer stream outwardly and the inner stream inwardly; as illustrated this means comprises a ring 127 having an end portion 127a of divergent axial cross-section. One of the two streams assists in the atomization of fuel flowing over the lip 118a and the other assists in the atomization of fuel flowing over the lip 117a. In this manner inner and outer substantially continuous annular sheet sprays of atomized fuel are produced within the flame tube.

In a modification of the above-described arrangement the fuel may be arranged to be sprayed on to the surfaces of the ring 127 to flow over the sharp edges 127b and 127c.

Referring now to Figure 5, ring 127 supports a number of circumferentially-spaced pilot fuel injection nozzles 28 which are fed with fuel through passages 29 extending through the ring 27 from a pilot fuel manifold 30 supported on the ring 127. Such pilot nozzles may be used under low speed running conditions of the engine or for the purpose of initiating combustion of the main fuel sprays, or both under low speed running and for initiating combustion of the main fuel.

It will also be noticed that, whereas in Figure 4 the downstream portions of surfaces of the walls 117, 118 leading to the lips 117a, 118a are substantially parallel to one another and to the axis of the engine, in Figure 5 the downstream portions of the walls 117, 118 are frusto-conical and converge towards one another in the direction of air flow.

Fuel injectors as described with reference to Figures 3 and 3a may also be employed in the construction of Figures 4 and 5.

In the arrangements described so far, it will be appreciated that the inner and outer sheet-like sprays are of substantially conical form, the outer spray diverging radially outwards and the inner spray converging radially inwards. Thus the fuel is further mixed with air entering the perforations in the support strips 20 or 120.

A number of circumferentially-spaced strips as indicated at 31 in Figures 2 and 5 may be used to promote turbulence in the fuel/air mixture leaving the annular gaps between the ring 27 or 127 and wall members 17 and 18, or 117 and 118. These strips may be of curved cross-section to promote swirl in the fuel spray.

In the embodiment of combustion equipment shown in Figures 6 and 7, the air casing structure is fully annular and comprises an entry duct portion 50 which supports an annular flame tube entry portion 51. The flame tube proper comprises inner and outer walls 52 and 53 affording between them an annular combustion space.

Part of the compressed air delivered by the compressor system of the engine enters the flame tube entry portions 51, as indicated by arrow 54. Part of this air flows through passages 55 and 56 formed between the inner wall of the flame tube entry portion 51 and an inner ring member 57, and between the outer wall of the flame tube entry portion 51 and an outer ring member 58, and a further part of this air flows through passages 39 and 40 defined between the ring members 57 and 58 and further ring parts 41 and 42 which form part of the fuel injector assembly and are arranged radially between the members 57, 58. An annular passage 60 is formed between the ring parts 41 and 42 and this passage extends through the fuel injector assembly and conveys a third part of the combustion air from the entry portion 51 into the flame tube without substantial deviation in the passage. An annular baffle ring 45 is supported at the downstream ends of the ring parts 41 and 42 by lugs 45a, as more clearly shown in Figure 7.

The fuel supply means of the fuel injector assembly comprises two coaxial fuel manifolds 43 and 44. It will be seen that the fuel manifold 44 has a number of drilled circumferentially-spaced fuel orifices through which fuel is delivered into the passage 60 to form substantially continuous sheets of atomized fuel. The outer sheet 46 lies approximately in the surface of a cone and is divergent, and the inner sheet 47 lies approximately in the surface of a cone and is convergent. Both of the conical sheet sprays emerge into the flame tube space without contact with the spill lips formed by the downstream edges of the ring parts 41, 42 of the assembly.

The fuel manifold 43 has circumferentially-spaced drilled fuel orifices producing similar sprays of fuel 48 and 49, but these impinge on the inner annular surfaces bounding the passage 60, whereby the fuel flows to the spill lip on the ring parts 41 and 42. As a result atomization of the fuel is assisted by the flow of air through the passage 60.

It will be appreciated that in this arrangement under low airflow conditions fuel may be introduced directly into the flame tube without passing over a spill lip, while under high airflow conditions the atomization of fuel introduced into the flame tube is assisted by the flow of air through the passage or passages extending through the fuel injector assembly.

We claim:

1. Annular combustion equipment comprising an air casing structure having coaxial radially-spaced inner and outer annular walls, a flame tube structure accommodated between the air casing walls and comprising radially-spaced inner and outer walls which are coaxial with and spaced from the walls of the air casing, the flame tube walls defining between them a combustion space with an annular air inlet at one end and an annular combustion gas outlet at the opposite end, and a fuel injection assembly comprising radially-spaced inner and outer annular walls supported coaxially within said annular air inlet to the combustion space in radially spaced relation to the inner and outer walls thereof to define an annular air passage receiving part of the combustion air entering the combustion space without substantial deviation in the direction of flow, said injection assembly further comprising an annular ring supported between the inner and outer walls defining said annular air passage, thereby to divide the air flowing in said passage into radially inner and outer streams, said ring being shaped to deflect the inner airstream inwardly and the outer airstream outwardly, fuel distributor means being provided within said annular air passage upstream of said ring, said fuel distributor means including two rows of fuel injector orifices, one row of said orifices being positioned to supply a stream of fuel to the inner air stream and the other row of said orifices being positioned to supply a stream of fuel to the outer air stream.

2. Annular combustion equipment according to claim 1, wherein the ring has a portion of divergent cross-section in the direction of air flow through the annular air passage.

3. Annular combustion equipment according to claim 2, wherein the said portion of the ring and the adjacent portions of the walls of the fuel injection assembly together define paths for the inner and outer streams of air flowing from the annular air passage, which have a decreasing cross-sectional area for flow whereby the air streams are accelerated in flowing in said paths.

4. Annular combustion equipment according to claim 1, wherein the said one row and said other row of orifices are inclined respectively to direct the fuel sprays to impinge on the inner and outer walls of said annular passage, and these walls are provided at their downstream ends with sharp spill lips.

5. Annular combustion equipment according to claim 1, wherein the said one row and said other row of orifices direct annular fuel sprays respectively into the parts of said annular air passage carrying said inner and outer air streams.

6. Annular combustion equipment according to claim 1, wherein the said one row and said other row of orifices are inclined respectively to direct the fuel sprays to impinge on the inner and outer walls of the annular passage, and these walls are provided at their downstream ends with sharp spill lips, wherein there is provided second fuel distributor means in the annular air passage, said second fuel distributor means having a first set of spray orifices which together direct an annular fuel spray into the part of said annular air passage carrying said outer air stream, and a second set of spray orifices which together direct an annular fuel spray into the part of said annular air passage carrying said inner air stream.

7. Annular combustion equipment according to claim 1, wherein said ring carries a pilot fuel manifold to be positioned between said fuel distributor means and the ring, and a series of circumferentially-spaced pilot fuel injection nozzles projecting downstream from the ring and fed with fuel from said pilot fuel manifold through ducts in the ring.

8. Annular combustion equipment comprising an air casing structure having coaxial radially-spaced inner and outer annular walls, a flame tube structure accommodated between the air casing walls and comprising radially-spaced inner and outer walls which are coaxial with and spaced from the walls of the air casing, the flame tube walls defining between them a combustion space with an annular air inlet at one end and an annular combustion gas outlet at the opposite end, and a fuel injection assembly comprising radially-spaced inner and outer annular walls supported coaxially within said annular air inlet to the combustion space in radially spaced relation to the inner and outer walls respectively of the flame tube, thereby to define a first annular air passage between the outer wall of the fuel injection assembly and the outer wall of the flame tube, a second annular air passage between the inner wall of the fuel injection assembly and the inner wall of the flame tube and a third annular air passage between the inner and outer walls of the fuel injection assembly, an annular fuel distributor supported coaxially in the third air passage, and a ring supported between the inner and outer walls of the fuel injection assembly and downstream of the fuel distributor said ring dividing the air flowing in said third passage into radially inner and outer air streams, said ring being shaped to deflect the inner air stream inwardly and the outer air stream outwardly, and said annular fuel distributor having a first set of spray orifices through which fuel is sprayed into said inner air stream in a direction towards the combustion space and with a radially inward component of velocity and a second set of spray orifices through which fuel is sprayed into said outer air stream towards the combustion space and with an outward component of velocity.

9. Annular combustion equipment according to claim 8, wherein the ring has a portion of divergent cross-section in the direction of air flow through the third annular air passage.

10. Annular combustion equipment according to claim 9, wherein the said portion of the ring and the adjacent portions of the walls of the fuel injection assembly together define paths for the inner and outer streams of air flowing from the third annular air passage, which have a decreasing cross-sectional area for flow whereby the air streams are accelerated in flowing in said paths.

11. Annular combustion equipment according to claim 8, wherein the said first and second sets of spray orifices are inclined to direct the fuel sprays to impinge on the inner and outer walls respectively of the fuel injection assembly, and these walls are provided at their downstream ends with sharp spill lips.

12. Annular combustion equipment according to claim 8, wherein the said first and second sets of spray orifices are arranged together to direct annular fuel sprays into the parts of said third annular air passage carrying said inner and outer air streams.

13. Annular combustion equipment according to claim 8, wherein the said first and second sets of spray orifices are inclined to direct the fuel sprays to impinge on the inner and outer walls respectively of the fuel injection assembly, and these walls are provided at their downstream ends with sharp spill lips, wherein there is provided a second annular fuel distributor coaxially in the third air passage, said second annular fuel distributor having a first set of spray orifices which together direct an annular fuel spray into the part of said third annular air passage carrying said outer air stream, and a second set of spray orifices which together direct an annular fuel ducts in the ring.

14. Annular combustion equipment according to claim 8, wherein said ring carries a pilot fuel manifold to be positioned between said annular fuel distributor and the ring, and a series of circumferentially-spaced pilot fuel injection nozzles projecting downstream from the ring and fed with fuel from said pilot fuel manifold through spray into the part of said third annular air passage carrying said inner air stream.

References Cited in the file of this patent

UNITED STATES PATENTS

| | | |
|---|---|---|
| 718,931 | Hastings | Jan. 20, 1903 |
| 901,829 | Hamaley | Oct. 20, 1908 |
| 2,526,410 | Price | Oct. 17, 1950 |
| 2,657,532 | Reid et al. | Nov. 3, 1953 |
| 2,679,137 | Probert | May 25, 1954 |
| 2,780,060 | Griffith | Feb. 5, 1957 |

FOREIGN PATENTS

| | | |
|---|---|---|
| 525,083 | Belgium | Dec. 31, 1953 |
| 657,789 | Great Britain | Sept. 26, 1951 |